United States Patent [19]
Ishida et al.

[11] Patent Number: 5,094,127
[45] Date of Patent: Mar. 10, 1992

[54] ADAPTIVE CONTROL SYSTEM FOR VEHICLES

[75] Inventors: Akira Ishida, Sakai; Masahiro Takada, Hirakata; Kazushige Narazaki, Neyagawa; Osamu Ito, Kodoma, all of Japan

[73] Assignee: Matsushita Electric Industrial Co., Ltd., Osaka, Japan

[21] Appl. No.: 614,514

[22] Filed: Nov. 16, 1990

[30] Foreign Application Priority Data

Nov. 21, 1989 [JP] Japan .................................. 1-302901

[51] Int. Cl.⁵ ............................................. B60K 41/06
[52] U.S. Cl. ......................................... 74/866; 74/857
[58] Field of Search .......................... 74/857, 889, 866; 180/175-179; 280/91; 364/426.04

[56] References Cited

U.S. PATENT DOCUMENTS

| | | | |
|---|---|---|---|
| 4,463,822 | 8/1984 | Tanigawa et al. | 74/859 X |
| 4,535,864 | 8/1985 | Tanigawa et al. | 74/866 X |
| 4,695,068 | 9/1987 | Kawamoto et al. | 280/91 |
| 4,736,813 | 4/1988 | Hayama et al. | 74/866 X |
| 4,747,326 | 5/1988 | Braun | 74/866 |
| 4,913,006 | 4/1990 | Tsuyama et al. | 74/866 |
| 4,938,604 | 7/1990 | Naoto et al. | 180/179 X |
| 4,939,657 | 7/1990 | Imai et al. | 180/179 X |
| 4,961,146 | 10/1990 | Kajiwara | 180/179 X |
| 4,967,865 | 11/1990 | Schindler | 280/91 X |
| 4,998,201 | 3/1991 | Mori | 280/91 X |

FOREIGN PATENT DOCUMENTS 62-241737 10/1987 Japan.

OTHER PUBLICATIONS

Ito et al., "A New Way of Controlling a Four Wheel Steering Vehicle", Proceedings of the Japan Society of Instrument and Control Engineers, pp. 828-834, vol. 23, No. 8 (1987).

Mori et al., "Improvement in Vehicle Control and Stability Through Optimizing the Transient Steer Characteristics", Preprints for the Scientific Lecture Meeting of the Japan Car Technical Academy 891068, in 1989, pp. 279-282.

Youcef-Toumi, et al., "A Time Delay Controller for Systems With Unknown Dynamics," Massachusetts Institute of Technology, vol. 112, pp. 133-142, Mar. 1990.

Youcef-Toumi, et al., "Model Reference Control Using Time Delay For Nonlinear Plants With Unknown Dynamics," Massachusetts Institute of Technology, pp. 380-387, Jun. 1986.

*Primary Examiner*—Dwight Diehl
*Attorney, Agent, or Firm*—Stevens, Davis, Miller & Mosher

[57] ABSTRACT

An adaptive control system for vehicles using a time delay control method which applies a reference model for giving desired response characteristics, assumes that terms of an unknown section such as for variations of plant dynamics are constant for a minute time period, and estimates this variation of the unknown section to calculate a control input that follows said reference model.

5 Claims, 10 Drawing Sheets

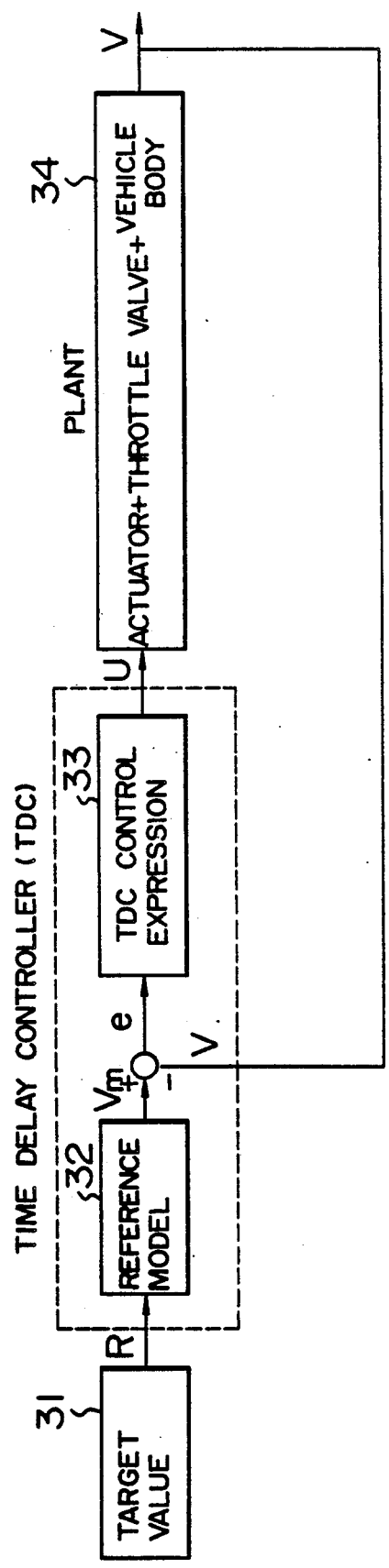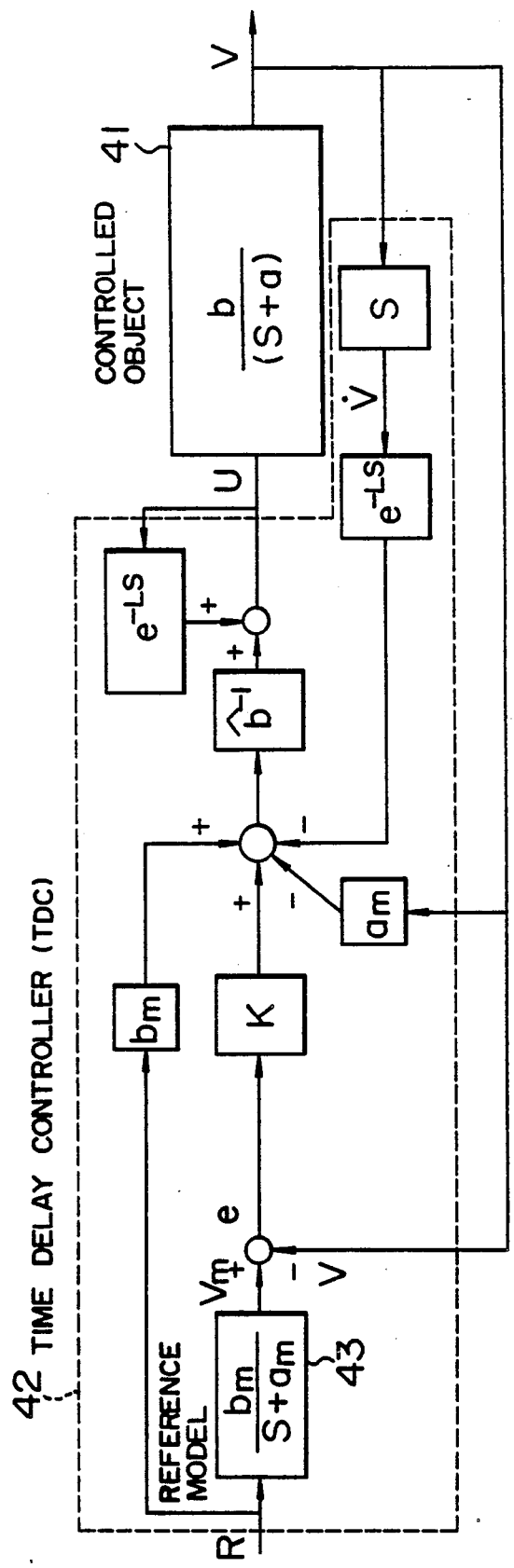
FIG. 3
FIG. 4

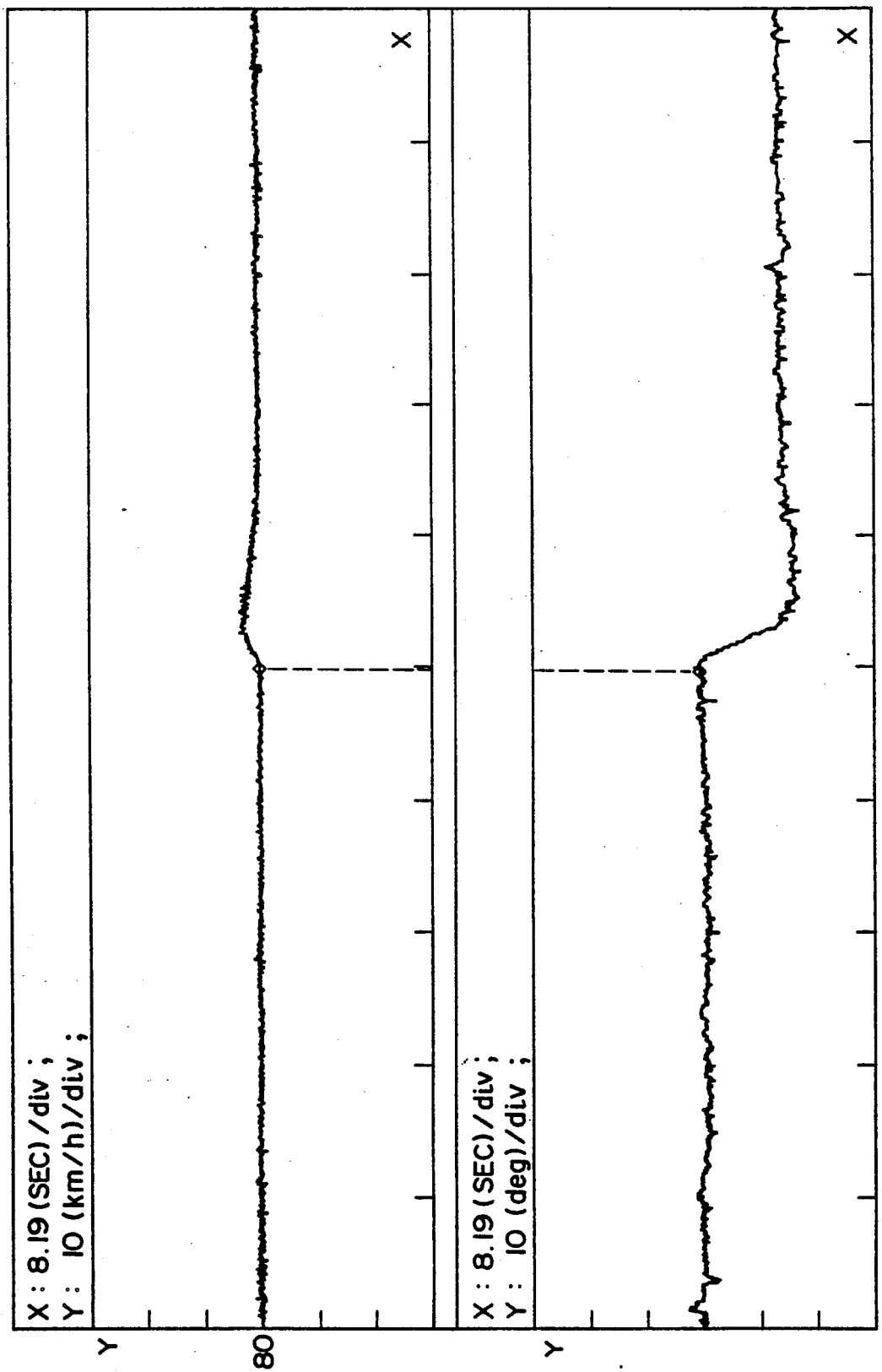

ADAPTIVE CONTROL SYSTEM FOR VEHICLES

BACKGROUND OF THE INVENTION

The present invention relates to an adaptive control system for vehicles which can stably control vehicles at a desired response, in particular those using a non-linear plant power such as an engine, even if an unknown disturbance occurs or when a variation in properties such as gain and the like of the power plant itself, and is effective, for example, in an auto speed control system or a four-wheel steering system for vehicles.

DESCRIPTION OF THE RELATED ART

Various control laws conventionally relate to control of vehicles (particularly engines), to secure robustness properties of which plant dynamics change with time. For example, a speed control system for vehicles is disclosed in JP-A-62-241737. According to the speed control system disclosed in the reference, a transfer function from a throttle value opening to vehicle speed is obtained by using frequency response methods, etc., by changing a road gradient or a vehicle speed range, and various linear models derived therefrom. Based on those linear models, an optimum feedback gain is calculated by a design method for an optimum regulator of additional integration type, and a control quantity or a value of controlled variable is calculated by using various detected values such as a car speed and a throttle value opening, etc. Therefore, with this structure, the response and follow-up characteristics of speed control can improve and an auto speed control of high precision is ensured.

For a four-wheel steering system, there are two known proposals; a method for controlling an angle difference between a vehicle running direction and a vehicle direction to be maintained at zero, that is, a method for controlling a car body side slip angle to be always zero during steering of a car steering wheel ("Improvement in Vehicle Control and Stability through Optimizing the Transient Steer Characteristics of 4 Wheel Steering", by Kazunori Mori, et al., Nissan Motor Co., Ltd., a Preprint for the Lecture Meeting of the Society of Automotive Engineers of Japan, 891068, in 1989), and a model adaptative control system for controlling a yaw rate output of a vehicle at the same value as an output yaw rate of a model which is introduced in the system ("A New Way of Controlling a Four-Wheel Steering Vehicle", by Satoshi Itoh, Nissan Motor Co., Ltd., Kimio Kanai, the National Defense Academy, Yokosuka, Japan, et al., Transactions of The Society of Instrument and Control Engineers of Japan, Vol. 23, No. 8).

However, such conventional Auto speed control systems as described above which are based on the feedback control have a problem that design development of a control system for the system requires great time and cost to obtain an optimum control performance in each running condition which differs depending on changes of road gradients, difference of car speed range, changes of car load, etc.

Further, the system applied to a four-wheel steering system has a problem that both a car body side slip angle and a yaw rate can not be controlled concurrently because one of these two factors is selected to be controlled in the system.

SUMMARY OF THE INVENTION

It is an object of the present invention to provide an auto speed control system with a simple structure which can follow, in high precision, an output of a reference model which provides plant dynamics, by estimating an unknown term, based on a concept that, even if plant dynamics vary due to unknown disturbances such as changes of road gradient, for example, such variations are constant for a very short time period.

In order to achieve the above object, the present invention provides a structure which operates based on time delay control rules, comprising a detection circuit for detecting an actual speed of a vehicle, a target value setting circuit for setting the desired vehicle speed based on a will of a driver, a command circuit for commanding each switch signal such as cancelling, resume, etc., a reference model setting circuit for setting response characteristics when an actual vehicle speed converges to the desired target vehicle speed after a resume signal is produced from said command circuit, and a controlled variable calculation means for calculating a value of control input to be applied to manipulate an actuator that drives a throttle valve so that an actual vehicle speed coincides with the desired vehicle speed. With the above configuration, the system employs a control equation relating to a control input calculation of the controlled variable calculation means by using a vehicle speed detected by the detection circuit and a target track vehicle speed given by said reference model, that is a vehicle speed which varies following a track expressing an ideal change of the vehicle speed when an actual vehicle speed converges to the desired vehicle speed with the desired response, and a concept is introduced that a value of the plant disturbance is negligible for a minute time period, thereby to estimate an unknown term and calculate a control input in order to get desired response.

In the four wheel steering system, a reference model is prepared which provides a front wheel steering angle and a rear wheel steering angle so that both a vehicle body side slip angle and a yaw rate are controlled concurrently, and unknown variation terms such as modelling errors and disturbances are estimated to aim at realizing stable control in spite of plant variations.

With the above-described structure of the auto speed control system according to the present invention, an excellent response, that is, a trajectory of control to be followed, at the resume time, etc. are obtained in accord with a vehicle speed change tracking the desired locus derived from the reference model, and controlled variables for the actuator are calculated so that an actual vehicle speed detected converges to the target vehicle speed with the desired response. Further, even in a variation of dynamics of the vehicle at a slope or the like, time delay control laws enable an auto speed control system robust-stable with the desired response, which estimate variation terms based on the assumption that a variation during a minute time period is negligibly small. Further, even when a vehicle type changes resulting in changes of plant gains and time constants, an auto speed control with the same precision can be realized by very simple adjustments of input parameters. Therefore the control system can be mounted on any type of vehicle without any complex tuning.

In the four-wheel steering system, time delay control laws realize a system which provides a reference model of a yaw rate corresponding to a steering wheel angle with a side slip angle kept at zero, and attains a yaw rate response expected by the reference model. The above-mentioned system which gets a steering wheel angle as an input, calculates a controlled variable of the front wheel steering angle and rear wheel steering angle for obtaining the above response and controls steering angles of the front and rear wheels according to the calculated controlled variable, enables a stable running with a side slip angle of the vehicle kept always at zero and with the same yaw rate response as the reference model.

As described above, according to the present invention, a reference model for outputting a target track vehicle speed which shows a desired response waveform is provided and unknown variations are estimated on the assumption that there is no variation for a very short time period, so that even if the plant dynamics change, an actual vehicle speed follows a target trajectory or a target track vehicle speed with high precision and can converge to the target vehicle speed. Further control laws for obtaining desirable response waveforms can be easily realized by circuits or microcomputers, and parameters can be set easily and logically. Therefore, when this system is to be applied to a vehicle of different type, tuning time and cost can be reduced, thus compatibility of the system among all types of vehicles can be realized. In the four wheel steering system, both the front and rear wheel steering angles are controlled to keep a vehicle body side slip angle always at zero and to obtain the same yaw rate response as the model. As a result, high speed stability and steerability of a vehicle can be realized.

BRIEF DESCRIPTION OF THE DRAWINGS

FIG. 3 is a control block diagram showing the control concept of the above embodiment;

FIG. 4 is a structure diagram of the control law for the time delay controller (TDC);

FIGS. 5A to 5D are diagrams showing the experimental results when the present invention applied to an actual vehicle; FIG. 5A showing experimental data indicating a setting operation, FIG. 5B and FIG. 5C showing experimental data when a read gradient changes, and FIG. 5D showing experimental data of a resume operation;

DESCRIPTION OF THE PREFERRED EMBODIMENTS

The auto speed control system for automotive vehicles according to the present invention is described below with reference to the drawings.

Figure 1:
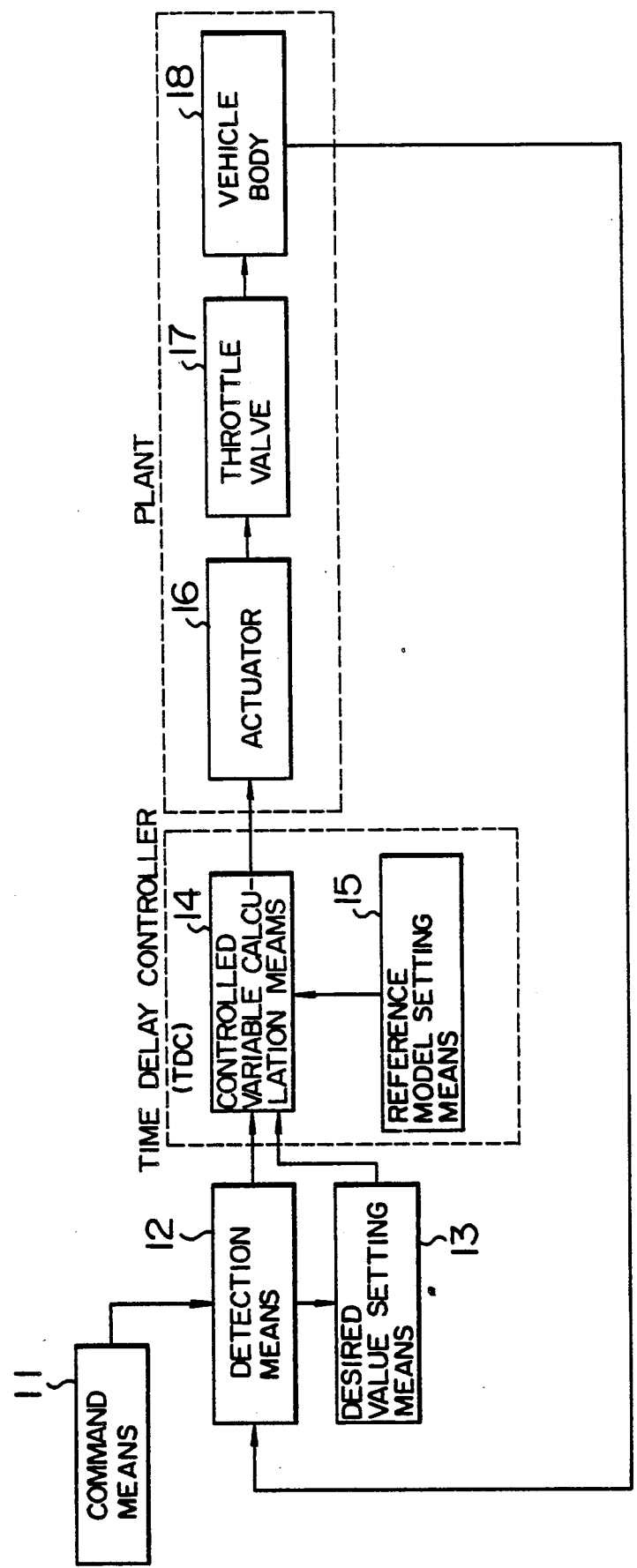
FIG. 1 is a configuration diagram showing the concept of an auto speed control system in one embodiment of the present invention relating to an adaptive control system for vehicles.

The configuration of the system applied with an auto speed control system for vehicles and the configuration of the control system will be explained first. FIG. 1 is a configuration diagram which shows the concept of one embodiment of the present invention. Numeral 11 designates a command circuit which is applied with a constant speed run command signal, a resume signal for performing a constant speed run at a resumed speed after cancelling the constant speed run command, an acceleration and deceleration signal for increasing or reducing a speed of a vehicle which is running at a constant speed, etc. When a constant speed run command signal is applied to the command circuit 11, an actual vehicle speed is detected by a detection circuit 12, and the detected vehicle speed is set as the target vehicle speed by a target value setting circuit 13. A reference model setting circuit 15 sets a reference model which is input with the above mentioned vehicle speed and outputs the target track vehicle speed along which an actual vehicle speed converges to the target vehicle speed with desired response characteristics. Using this setting method, a reference model of the same dimension as that of the controlled object in the frequency domain is to be set so that the deviation of the actual vehicle speed from the target vehicle speed has desired time constants and gains in convergence. A controlled variable calculation means 14 calculates a control input to the plant, that is, the control input to an actuator 16, based on the target vehicle speed and actual vehicle speed, such that the actual vehicle speed tracks to the target vehicle speed with desired response characteristics, that is, an error of the actual vehicle speed from the target track vehicle speed which is output from the reference model gets to zero. A controlled object or a plant consists of an actuator 16, a throttle value 17 and a vehicle body 18 in this case. By the above operation, the opening of the throttle valve 17 is adjusted by the actuator 16 and the vehicle speed is getting to the target vehicle speed with desired response through the vehicle body 18, so that an auto speed control system which ensures a stable run at the target vehicle speed is realized.

Figure 2:
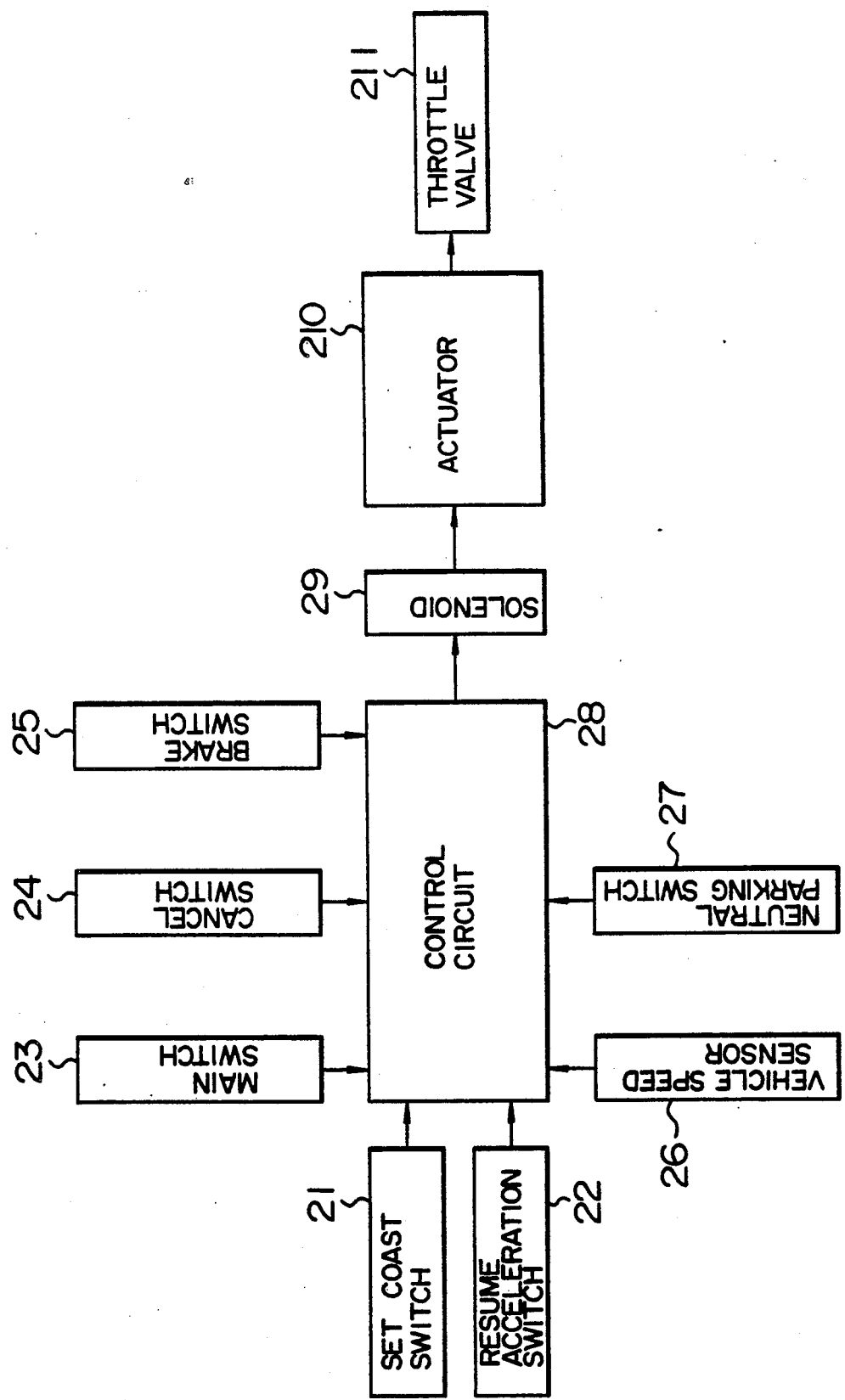
FIG. 2 is a system configuration diagram of an auto speed control system in the above embodiment of the present invention relating to an adaptive control system for vehicles.

FIG. 2 shows a system configuration diagram of one embodiment of the present invention. In the drawing, numeral 28 designates a control circuit which comprises a CPU, a ROM, a RAM, an I/0 unit, etc., performing an auto speed control based on input signals of various sensors and switches. 23 designates a switch for supplying power to the actuator power source, the control circuits and others. 21 designates a set and coast switch which functions both as a set switch for supplying a constant speed run command signal and as a coast switch for lowering a set value of the target vehicle speed. 22 designates a resume and acceleration switch which functions both as a resume switch for supplying a command signal to return to the target speed and as an acceleration switch for increasing a set value of the target vehicle speed. 25 designates a brake switch which is turned on when the brake lever is operated, 24 designates a cancel switch for cancelling the set and resume functions, and 26 designates a vehicle speed sensor for detecting an actual vehicle speed. 27 designates a neutral parking switch for detecting a gearing stage at a neutral position or a parking position, and 29 designates a solenoid for either supplying or interrupting power to an actuator 210 at start or stop of a constant speed running, respectively. When either the set switch 21 or the resume switch 22 is turned on to start the auto speed control, the solenoid 29 is turned on by the control circuit 28, and the control circuit 28 calculates a controlled variable to make the actual vehicle speed to converge to the target vehicle speed. By driving the actuator 210 with this controlled variable, a throttle valve 211 is throttled to adjust quantity of fuel to be supplied to the engine, thus realizing the auto speed control. When the main switch 23 is turned off or any one of switches including the cancel switch 24, the brake switch 25 and the neutral parking switch 27 is turned on while the vehicle is running at a constant speed, the power supply to the solenoid 29 is cut so that the auto speed control is cancelled.

FIG. 3 is a control block diagram for the above embodiment. The concept of model following control of the time delay controller (TDC) which is a kind of adaptive control will be explained based on this diagram. A plant 34 which is a controlled object comprises an actuator 16, a throttle valve 17 and a vehicle body 18, and with a target opening input U, the actuator 16 adjusts the opening of the throttle valve and an output of a vehicle speed V is produced by the vehicle body 18. When a constant speed run command signal is applied, the target value setting circuit 13 stores the current vehicle speed V as a target vehicle speed R or a target value 31 for a constant speed running. A reference model 32 which is provided by the reference model setting circuit 15, being applied with a target vehicle speed R as an input, produces an output of a target track vehicle speed Vm which gives a desired response waveform. The time delay controller calculates a controlled variable U to be supplied to the actuator 16 in order that a deviation e of the actual vehicle speed V from the target track vehicle speed Vm becomes zero.

By the above operation, an actual vehicle speed can be controlled to converge to a target vehicle speed with desired response characteristics, that is, a speed control can be performed to make an actual vehicle speed to follow the target track vehicle speed which is an output of the reference model.

Then, the control system design concept for the time delay controller (TDC, hereinafter) will be described in the followings. The TDC is a controller effective for a system which has unknown dynamics. A method for obtaining control laws for a non-linear plant by which control follows a reference model will be explained below. Detailed description of this method are shown, for example, in the "On Model Reference Control Using Time Delay for Non-linear Systems with Unknown Dynamics", by K. Youcef-Toumi and O. Ito, M.I.T. Report LMP/RBT 86-06, June, 1986.

A non-linear plant as a controlled object is to be expressed by the following expression.

$$\dot{X} = f(X, t) + h(X, t) + B(X, t) U(t) + d(t) \quad (1)$$

where, X is a state output, f is a known part of the dynamic equation, h is an unknown part of the dynamic equation, B is a known input distribution matrix and d is an unknown disturbance.

The reference model is given by the following expression:

$$\dot{X}m = AmXm + BmR \quad (2)$$

where, Xm is a state output value of a reference model, Am is a system matrix, Bm is an input distribution matrix, and R is an input of the reference model. The model orders of variables are as follows;

$$X, f, h, d \text{ and } Xm: n \times 1 \ U, R: r \times 1 \ B, Bm: n \times r \ Am: n \times n.$$

Therefore, an error vector can be defined by the following expressions derived from the expressions (1) and (2):

$$e = xm - X \quad (3)$$

$$\dot{e} = \dot{X}m - \dot{X} = Ame + \{-f - h - d + AmX + BmR - BU\} \quad (4)$$

As the following substitution is made, i.e.

$$-f - h - d + AmX + BmR - BU = Ke \quad (5)$$

then, we obtain $$\dot{e} = (Am + K) e = Aep \quad (6)$$

where, Ae represents an error system matrix, and K represents an error feedback gain. Therefore, by suitably selecting the error feedback gain K, a desired error dynamics can be obtained. It is necessary to select a control input U so as to satisfy the expression (5) all the way. Then, from the expression (5), an approximate solution of the U is given by the following expression:

$$U = (B^T B)^{-1} B^T \{-f - h - d + AmX + BmR - Ke\} \quad (7)$$

where, $(B^T B)^{-1} B^T$ is a pseudo-inverse matrix. By substituting the expression (7) into the expression (1), the following expression is obtained.

$$\dot{X} = f + h + B(B^T B)^{-1} B^T \{-f - h - d + AmX + BmR - Ke\} + d \quad (8)$$

The expression (4) can be transformed to the following expression.

$$\dot{e} = \{Am + B(B^T B)^{-1} B^T K\} e + \{I - B(B^T B)^{-1} B^T\} \{-f - h - d + AmX + BRm\} \quad (9)$$

In this case, when the order of the matrix B is nxn (rank n), the following expression is obtained:

$$1 - B(B^T B)^{-1} B^T = 0 \quad (10)$$

The expression (9) is given always by the following expression:

$$\dot{e} = \{Am + B(B^T B)^{-1} B^T TK\} e \quad (11)$$

When the expression (1) is divided into a known section and an unknown section, the following relationship is obtained:

$$h + d = \dot{X} - f - BU \quad (12)$$

Then, the following assumption is made, where L expresses a very small time delay.

$$h(X, t) + d(t) \approx h(X, t-L) + d(t-L) \quad (13)$$

From the expressions (12) and (13), unknown terms h+d are estimated by the following expression:

$$h(X, t) + d(t) = \dot{X}(t-L) - f(X, t-L) - B(X, t-L) U(t-L) \quad (14)$$

By substituting this estimated value into the expression (7), a control law of the time delay control is given by the following expression:

$$U(t) = \{B^T(t)B(t)\}^{-1}B^T(t)\{-f(t)-X(t-L)+f(t-L)+B(t-L)U(t-L)+AmX(t)+BmR(t)-Ke(t)\} \quad (15)$$

Then, when the order of the matrix B is n×r (rank r), each element of the expression (1) can be divided as follows.

$$f(X, t) = \left|\begin{array}{c} X_S \\ \hline fr(X, t) \end{array}\right| \quad h(X, t) = \left|\begin{array}{c} 0 \\ \hline hr(X, t) \end{array}\right| \quad (16)$$

$$X = \left|\begin{array}{c} Xq \\ \hline Xr \end{array}\right| \quad B(X, t) = \left|\begin{array}{c} 0 \\ \hline Br(X, t) \end{array}\right|$$

$$d(t) = \left|\begin{array}{c} 0 \\ \hline dr(t) \end{array}\right|$$

where, orders of each component are as follows:

$Xq$, 0, $Xs(=[X_{r+1}, \ldots, X_n]^T)$: $(n-r)\times l$ $Xr, fr, hr, dr$: $r\times l$, $Br$: $r\times r$ Similarly, the reference model and the error feedback gain are divided as follows:

$$Am = \left|\begin{array}{c|c} 0 & Iq \\ \hline \multicolumn{2}{c}{Amr} \end{array}\right| \quad Bm = \left|\begin{array}{c} 0 \\ \hline Bmr \end{array}\right| \quad K = \left|\begin{array}{c} 0 \\ \hline Kr \end{array}\right| \quad (17)$$

Orders of the elements are as follows:

| | | |
|---|---|---|
| 0 in Am: (n − r) × (n − r), | 0 in Bm: (n − r) × r | |
| 0 in K: (n − r) × n, | Iq: (n − r) × r | |
| Amr: r × n, | Bmr: r × r, | Kr: r × n |

In this case, $(B^TB)^{-1}B^T = [0\ Br^{-1}]$ and the expression (15) can be transformed to the followings:

$$U(t)=Br^{-1}(t)\{-fr(t)-Xr(t-L)+fr(t-L)+Br(t-L)U(t-L)+AmrX(t)+BmrR(t)-Kre(t)\} \quad (18)$$

At this time, the following relationships exist:

$$I - B(B^TB)^{-1}B^T = \left|\begin{array}{cc} I & 0 \\ 0 & 0 \end{array}\right| \quad (19)$$

$$-f - h - d - AmX + BmR = \quad (20)$$

$$\left|\begin{array}{c} 0 \\ -fr - hr - dr - AmrX + BmrR \end{array}\right|$$

From the expressions (19) and (20), the following expression is always valid, as well as the expression (11).

$$\{I-B(B^TB)^{-1}B^T\}\{-f-h-d+AmX+BmR\}=0 \quad (21)$$

As a result, the expression (18) represents the general control law for the time delay controller.

The ways of building the model and designing the control system with the TDC utilizing an identification experiment of an actual system will be described below. First, system identification is carried out to build a vehicle model. In the experiments for the present embodiment, the plant was identified by the frequency response method, in which a sinusoidal wave signal was applied as an input to the plant, and the transfer function from the input to the output was drived from the amplitude ratio and the phase difference of the input waveform from the output waveform obtained as a result. Controlled objects were considered to include the actuator 16, the throttle valve 17 and the vehicle body 18. The transfer function is expressed by G(S), and an input and an output are expressed by U(S) and V(S) respectively. In this case, U(S) represents a target opening input to the actuator and V(S) represents a vehicle speed. The G(S) is determined by the frequency response method mentioned above. In general, a transfer function can be expressed by the following expression when S represents a differential operator:

$$G(S) = \frac{b_1 S^{n-1} + \ldots + b_{n-1}S + b_n}{S^n + a_1 S^{n-1} + \ldots + a_n} \quad (22)$$

By identification experiments, model order of n and coefficients $a_1, a_2, \text{---} a_n, b_1, \text{---}, b_n$ of the expression (22) are to be obtained. As a result of carrying out identification experiments by changing run conditions (i.e., road gradient, vehicle speed area, and gear stage position), model order of the transfer function from the actuator to the vehicle body were obtained as follows:

$$G(S) = \frac{V(S)}{U(S)} = \frac{K}{1 + T1 \cdot S} \quad (23)$$

(30 mHz–300 mHz)

$$= \frac{b}{S + a} \quad a = 1/T1, b = K/T1$$

where, $T_1$ represents a time constant of the plant and K represents a plant gain. a and b vary depending on the vehicle run conditions, and the ranges of variations were obtained as follows:

$$0 < a\ \min < a < a\ \max \quad (24)$$

$$0 < b\ \min < b < b\ \max \quad (25)$$

Next, the control law of the expression (18) is obtained based on the identification result of the expression (23). The expression (23) is transformed to an expression in time domain as follows:

$$V(t) = -aV(t) + bU(t) \quad (26)$$

A stable reference model is given by the following expression:

$$Vm(t) = -am Vm(t) + bmR(t)\ am,\ bm > 0 \quad (27)$$

A reference error model is given by the following expression:

$$e(t) = -(am + K) e(t)\ am + K > 0 \quad (28)$$

where, $$e(t) = Vm(t) - V(t) \quad (29)$$

K represents an error feedback gain, and the desired error dynamics can be obtained by suitably selecting the error feedback gain K. Considering the expressions (26),

(27) and (29), the relationship of the expression (28) can be expressed by the following expressions:

$$e = -ame - amV + bmR + aV - bU \quad (30)$$

$$-amV + bmR + aV - bU = -Ke \quad (31)$$

Therefore, when a control input U which satisfies the expression (31) is applied, the obtained response satisfies the expression (28). Such control input can be provided according to the following expression:

$$U = b^{-1}(-amV + bmR + aV + Ke) \quad (32)$$

The above expression, however, includes unknown variable a and b, and therefore the control input U can not be determined in this state. Thus, the unknown sections is to be estimated.

First, the expression (26) is reformed to separate the unknown section aV from the rest, as follows:

$$aV = -V + bU \quad (33)$$

When L is a slight time delay, letting $aV = h$, the following relationship can be assumed:

$$h(t) \approx h(t - L) \quad (34)$$

From the expressions (33) and (34), the unknown term h is assumed by the following expression:

$$h(t) = -V(t - L) + bU(t - L) \quad (35)$$

When this estimated value is substituted into the expression (32), the control laws for the TDC relating to the auto speed control system is given by the following expression:

$$U(t) = U(t - L) + b^{-1}\{-V(t - L) - amV(t) + bmR + Ke\} \quad (36)$$

The expression (36) for calculating the control input U still includes the unknown term b, and therefore, the control input U(t) to the actuator can not be determined in this state. Accordingly, an actual control input is to be obtained by substituting an estimated value of the b into the expression (36) to realize a stable control system. Then the control input is given by the following expression:

$$U(t) = U(t - L) + b^{-1}\{-V(t - L) - amV(t) + bmR + Ke\} b > 0 \quad (37)$$

FIG. 4 is a block diagram showing the details of the control laws given by the expression (37). When a certain control input U is applied to the controlled object 41, a vehicle speed V is outputted. With a target vehicle speed R as an input, a target track vehicle speed Vm is outputted from a reference model 43. A time delay controller 42 is structured so as to utilize a deviation e of an actual vehicle speed V from the target track vehicle speed Vm, a target vehicle speed R, the actual vehicle speed V and the above mentioned other parameters, and calculates the control input U to the controlled object 41 for maintaining the deviation e at zero. In this case, $-V(t-L)$ and $U(t-L)$ are terms for cancelling unknown section of the plant, $-amV(t) + bmR$ is a term for introducing dynamics into the reference model, and Ke is an error feedback term.

Then, the way of deriving the estimated value for making the whole control system stable will be described hereinafter. First, the expression (37) is Laplace transformed and then is arranged to obtain the following expression:

$$b(1 - e^{-LS})U(S) = \{-(Se^{-LS} + am)V(S) + bmR(S) + Ke(S)\} \quad (38)$$

Similarly, the expressions (26), (27) and (29) are also Laplace transformed as follows:

$$U(S) = b^{-1}(S + a)V(S) \quad (39)$$

$$bmR(S) = (S + am)Vm(S) \quad (40)$$

$$e(S) = Vm(S) - V(S) \quad (41)$$

From the expressions (38) to (40), the following expression is obtained:

$$\{bb^{-1}(S + a)(1 - e^{-LS}) + Se^{-LS} + am + K\}V(S) = (S + am + K)Vm(S) \quad (42)$$

Here, a Padé approximation is introduced into the expression (42). In other words, the following expression is substituted:

$$e^{-LS} = (2 - LS)/(2 + LS) \quad (43)$$

then, we get:

$$\frac{V(S)}{Vm(S)} = \frac{(2 + LS)(S + am + K)}{2bb^{-1}(S + a)LS + S(2 - LS) + (2 + LS)(am + K)} \quad (44)$$

Accordingly, a condition for making the above expressions stable can be obtained by Routh's rule of stability criterion. First, the denominator of the expression (44) is set as F(S), and arranged according to orders of S.

$$F(S) = (2bb^{-1} - 1)LS^2 + \{(2abb^{-1} + am + K)L + 2\}S + 2(am + K) \quad (45)$$
$$= A_0S^2 + A_1S + A_2$$

Considering the ranges of parameters in the expressions (24) through (28) and (37), it is clear that $A_1$ and $A_2$ are positive. Therefore, the following relation should be fulfilled to get the necessary and sufficient conditions for the stability:

$$A_0 = (2bb^{-1} - 1)L > 0 \quad (46)$$

Therefore, is to fulfill the following condition:

$$b > b/2 \quad (47)$$

Based on the above expression, is to be larger than ½ of the true value of b. When the parameter range of the expression (25) is taken into consideration, the expression (47) is transformed to the following expression:

$$b > b \, max/2 \quad (48)$$

From the above, by using the control input U obtained from the expression (37), it is possible to obtain such response that satisfies the reference error model of the expression (28).

In order to verify the effectiveness of the control system obtained in the above, a run control experiments were carried out by using an actual vehicle based on the control laws obtained from the expression (37). First, an actual vehicle was mounted on a chassis bench for identification experiments. The identification experiments were carried out based on various run conditions of the vehicle including road gradients ranging from +3% to −3%, car speeds from 50 Km/h to 100 Km/h, and gear stage positions of the 3rd and fourth. The actuator used was a stepping motor with resolving power of 0.315 deg/step with a deceleration gear. An input U(S) in the expression (23) is a number of steps to the stepping motor, and an output V(S) is an actual vehicle speed V (Km/h). As a result, the following values were given for the expressions (24) and (25):

$$0.01158 < a < 0.02313 \tag{49}$$

$$0.02869 < b < 0.08976 \tag{50}$$

b was the same as b max under the conditions that the road gradient was −3%, the car speed was low and the gearing stage was in the third position. Accordingly, a control system was designed by using the transfer function at the slope −3% in which b was as b max. Parameters of the reference model of the expression (27) were assumed as follows: am=0.125, bm=0.125, L=0.72 (sec), the estimated value =0.1 and k=0. Accordingly, the expression (37) became as follows.

$$U(t) = U(t-0.72) + \{-10V(t-0.72) - 1.25V(t) + 1.25 \cdot R\}b > 0 \tag{51}$$

Figure 5A:
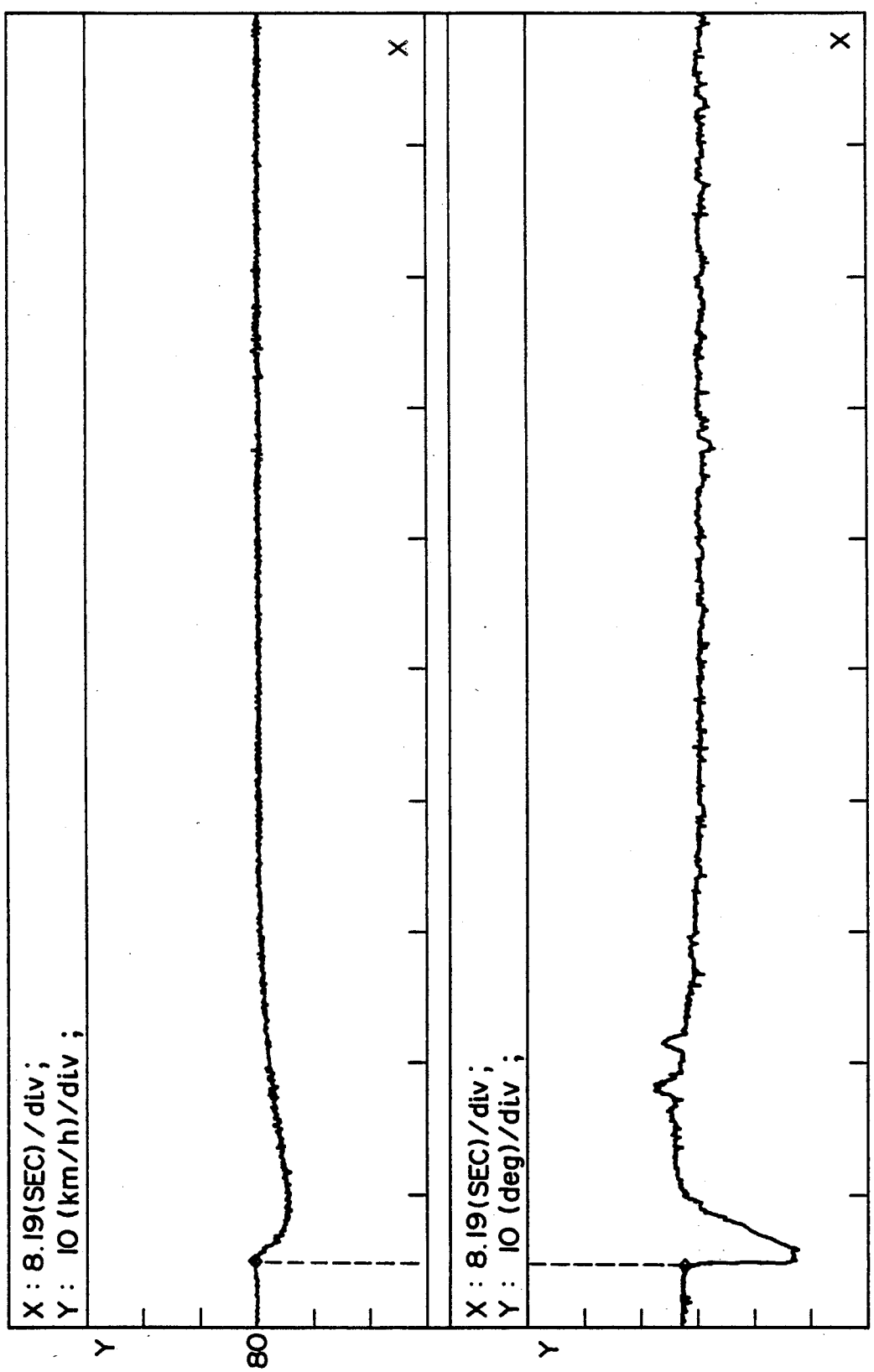
Figure 5C:
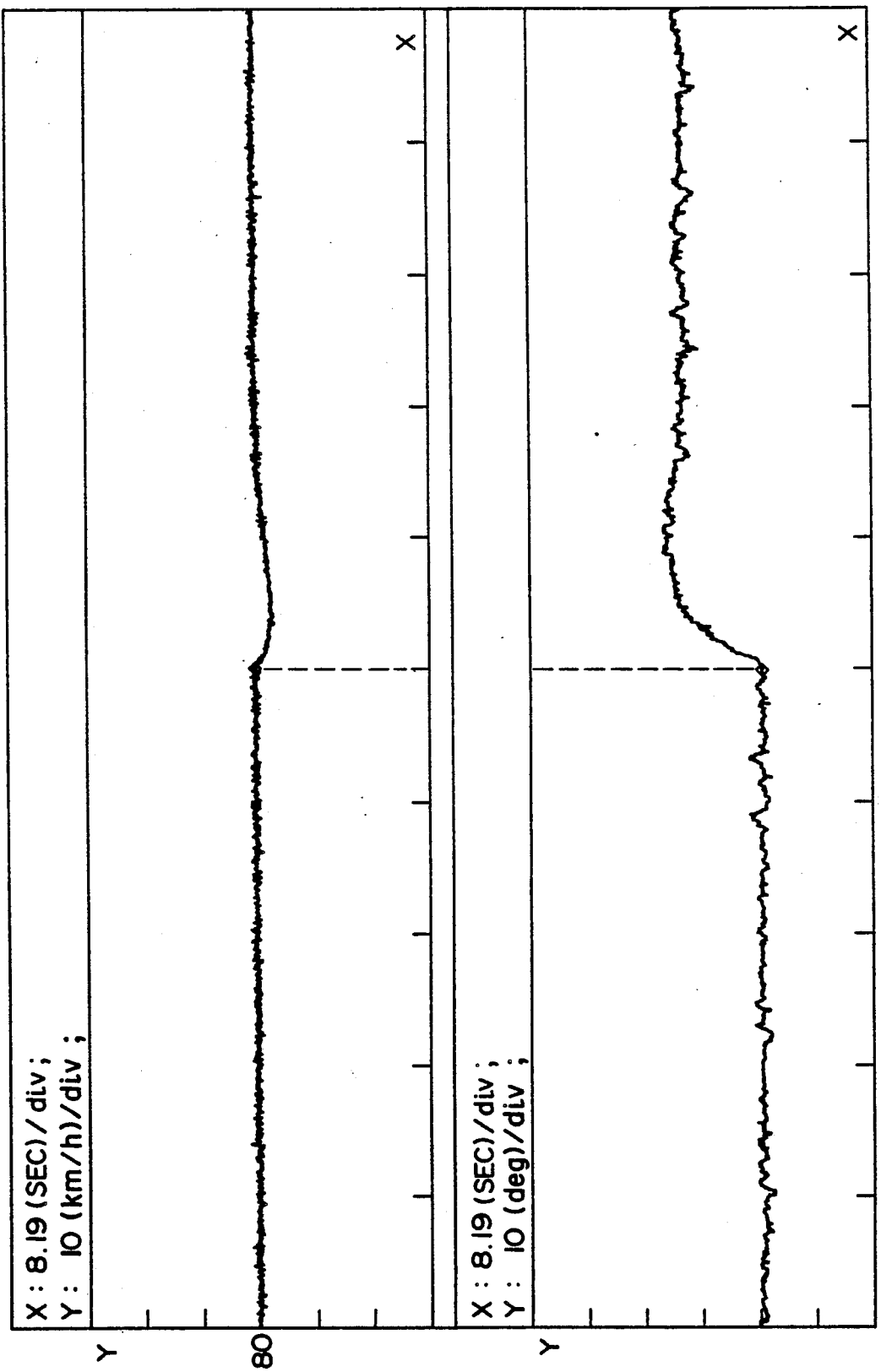
Figure 5D:
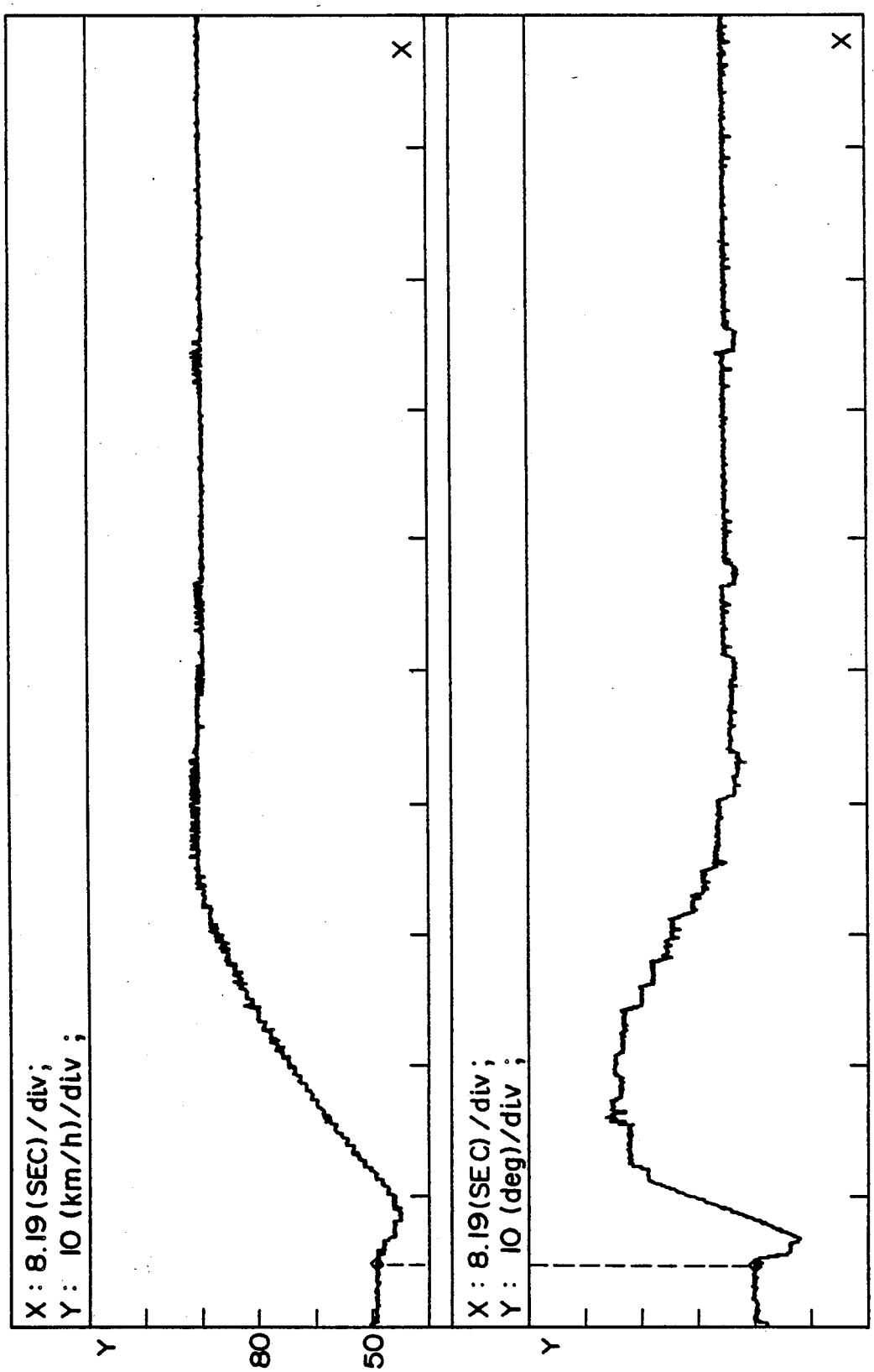
Figure 6:
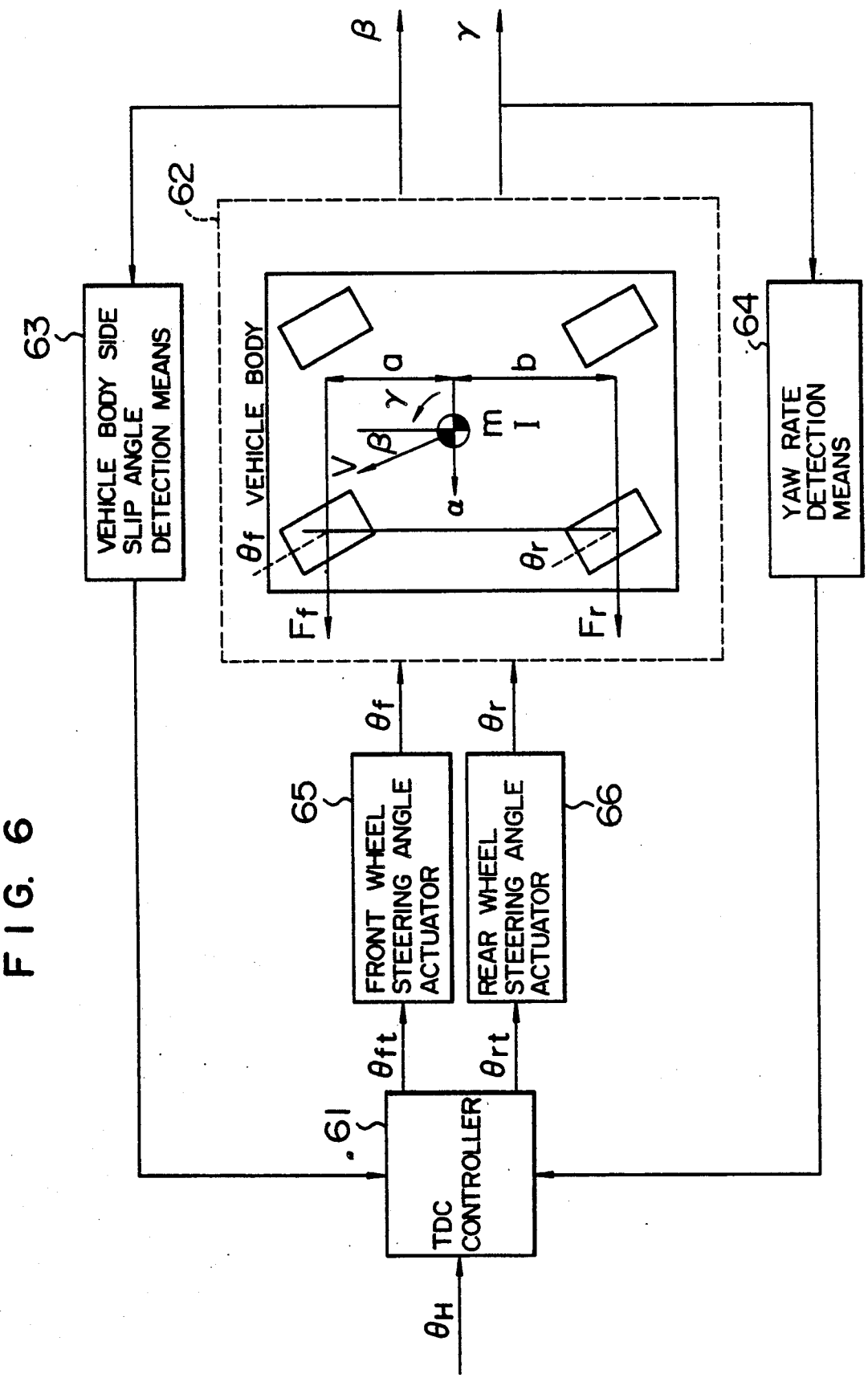
FIG. 6 is a configuration diagram in another embodiment of the present invention which is applied to a four-wheel steering operation.

FIGS. 5A to 5D show experimental data of an actual vehicle with the time delay controller for applying a control input in the expression (51). In these diagrams, the horizontal axis shows time, and the vertical axis in the upper half shows vehicle speed and the one in the lower half shows revolution angle of the stepping motor. FIG. 5A is a diagram which shows a set operation of a target vehicle speed at 80 Km/h while the road gradient was +3%, and FIG. 5B and FIG. 5C are diagram which show convergence performance when the road gradient changed from +3% to −3% and from −3% to +3% respectively while the vehicle was running at a constant speed of the target vehicle speed of 80 km/h. FIG. 5D is a diagram which shows a resume operation from 50 km/h to 80 km/h while the road gradient was 0%. From the result of the above experiment, it was indicated that the adaptive control system for vehicles according to the present invention is effective in an auto speed control system. As for the time delay controller, design has been made for the auto speed control in the present embodiment. However, the time delay controller may also be used for other control having other nonlinearity such as traction control, etc. In the present embodiment, we designed the system for the plant of first order and we got a satisfactory result. This may, however, be designed for systems of second order or of a higher order. Another preferred embodiment applying the present invention to a four wheel steering system will be described hereinafter. FIG. 6 shows a configuration diagram of the embodiment. The controlled object is a vehicle body 62 and the inputs are a front wheel steering angle and a rear wheel steering angle of the vehicle, and the outputs are a vehicle body side slip angle and a yaw rate. A time delay controller 61 has inputs of a steering wheel angle, a yaw rate detected by a yaw rate detection circuit 64 and a vehicle body side slip angle detected by a side slip angle detection-circuit 63. Based on these inputs, each of the control target steering angles of the front wheel steering angle and the rear wheel steering angle of the vehicle is calculated by the time delay controller 61. Both the front wheel steering angle and the rear wheel steering angle are controlled to the respective control target steering angle by a front wheel steering actuator 65 and a rear wheel steering actuator 66. In the control band width, it is assumed that the front wheel steering angle and the rear wheel steering angle always follow the control target steering angles. Therefore, it can be assumed hereinafter that the target steering angle is the same as the actual steering angle. A control target is to control the vehicle body side slip angle to be kept at zero both in transient state and in stable state to set a vehicle direction to be in consistent with the proceeding direction regardless of the vehicle speed, and to give a response model delivering a desired yaw rate corresponding to a steering wheel angle, to which a yaw rate response of an actual vehicle is coincided. It is known that a dynamic equation of a vehicle can be described as follows by using a two-wheel model.

$$\begin{pmatrix} \dot{\beta}(t) \\ \dot{\gamma}(t) \end{pmatrix} = \begin{pmatrix} a_{11} & a_{12} \\ a_{21} & a_{22} \end{pmatrix} \begin{pmatrix} \beta(t) \\ \gamma(t) \end{pmatrix} + \begin{pmatrix} b_{11} & b_{12} \\ b_{21} & b_{22} \end{pmatrix} \begin{pmatrix} \theta_f(t) \\ \theta_r(t) \end{pmatrix} \tag{52}$$

Coefficients for each row are as follows.

$$a_{21} = \frac{a^2 C_f + b^2 C_r}{IV} \tag{53}$$

$$a_{22} = \frac{bC_r - aC_f}{I} \tag{54}$$

$$a_{11} = -1 - \frac{aC_f - bC_r}{mV^2} \tag{55}$$

$$a_{12} = -\frac{C_f + C_r}{mV} \tag{56}$$

$$b_{21} = \frac{aC_f}{I} \tag{57}$$

$$b_{22} = -\frac{bC_r}{I} \tag{58}$$

$$b_{11} = \frac{C_f}{mV} \tag{59}$$

$$b_{12} = \frac{C_r}{mV} \tag{60}$$

where, m is the vehicle mass, I is the yawing moment of inertia, a is the distance from the front axle to the center of gravity, b the distance from the rear axle to the center of gravity, $C_f$ is the front tire cornering stiffness, $C_r$ is the rear tire cornering stiffness, $\theta_f$ is the steer angle of the front wheel, $\theta_r$ is the steer angle of the rear wheel, $\theta_H$ is the steering wheel angle, V the forward velocity, $\gamma$ the yaw rate, and $\beta$ is the vehicle body side slip angle. With the steering wheel angle $\theta_H$ as an input, the reference models $\gamma_m$ and $\beta_m$ of the yaw rate $\gamma$ and the vehicle body side slip angle $\beta$ are given as follows.

$$\begin{pmatrix} \dot{\beta}_m(t) \\ \dot{\gamma}_m(t) \end{pmatrix} = \begin{pmatrix} -a_{m1}, & 0 \\ 0, & -a_{m2} \end{pmatrix} \begin{pmatrix} \beta_m(t) \\ \gamma_m(t) \end{pmatrix} + \begin{pmatrix} a_{m1}G_1, & 0 \\ 0, & a_{m2}G_2 \end{pmatrix} \begin{pmatrix} 0 \\ \theta_H(t) \end{pmatrix} \quad (61)$$

Figure 7:
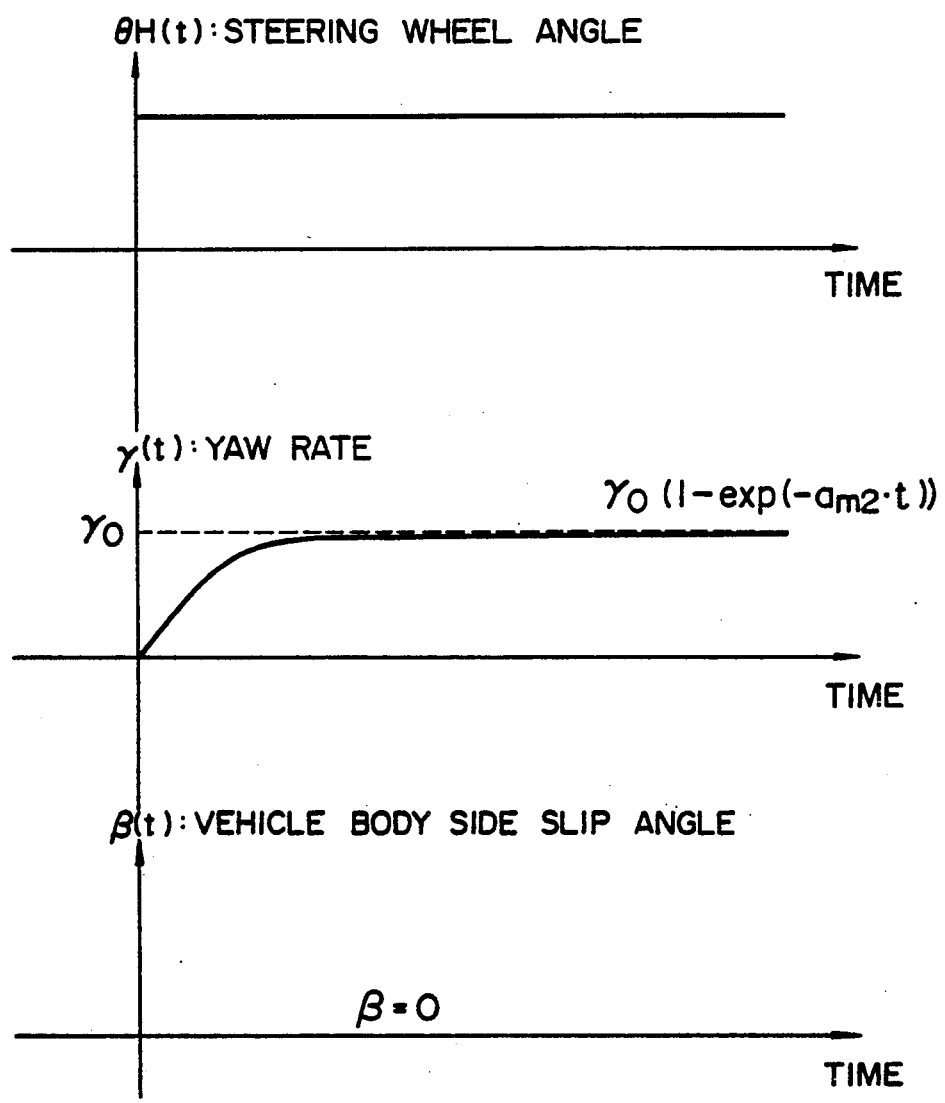
FIG. 7 shows desired responses of a yaw rate and a side slip angle which follow step changes of a steering wheel angle used in the present embodiment.

FIG. 7 shows target responses of the yaw rate and the side slip angle corresponding to a step-like variation of the steering wheel angle, for an example of a control target. An error vector is defined as follows.

$$\rho = \begin{pmatrix} \beta_m(t) \\ \gamma_m(t) \end{pmatrix} - \begin{pmatrix} \beta(t) \\ \gamma(t) \end{pmatrix} = \begin{pmatrix} \beta_m(t) - \beta(t) \\ \gamma_m(t) - \gamma(t) \end{pmatrix} \quad (62)$$

An error feedback matrix is defined as follows.

$$|K_r = \begin{pmatrix} -K_1, & 0 \\ 0, & -K_2 \end{pmatrix} \quad (63)$$

When the expressions (52) to (63) are applied to the expression (18), a result (64) similar to the expression (37) is obtained.

$$\begin{pmatrix} \theta_f(t) \\ \theta_r(t) \end{pmatrix} = \begin{pmatrix} \theta_f(t-L) \\ \theta_r(t-L) \end{pmatrix} + \begin{pmatrix} b_{11}, & b_{12} \\ b_{21}, & b_{22} \end{pmatrix}^{-1} \quad (64)$$

$$\left\{ \begin{array}{l} -\dot{\beta}(t-L) - a_{m1}\beta(t) + a_{m1}G_1xO + K_1(\beta_m(t) - \beta(t)) \\ -\dot{\gamma}(t-L) - a_{m2}\gamma(t) + a_{m2}G_2x\theta_H(t) + K_2(\gamma_m(t) - \gamma(t)) \end{array} \right\}$$

Figure 8:
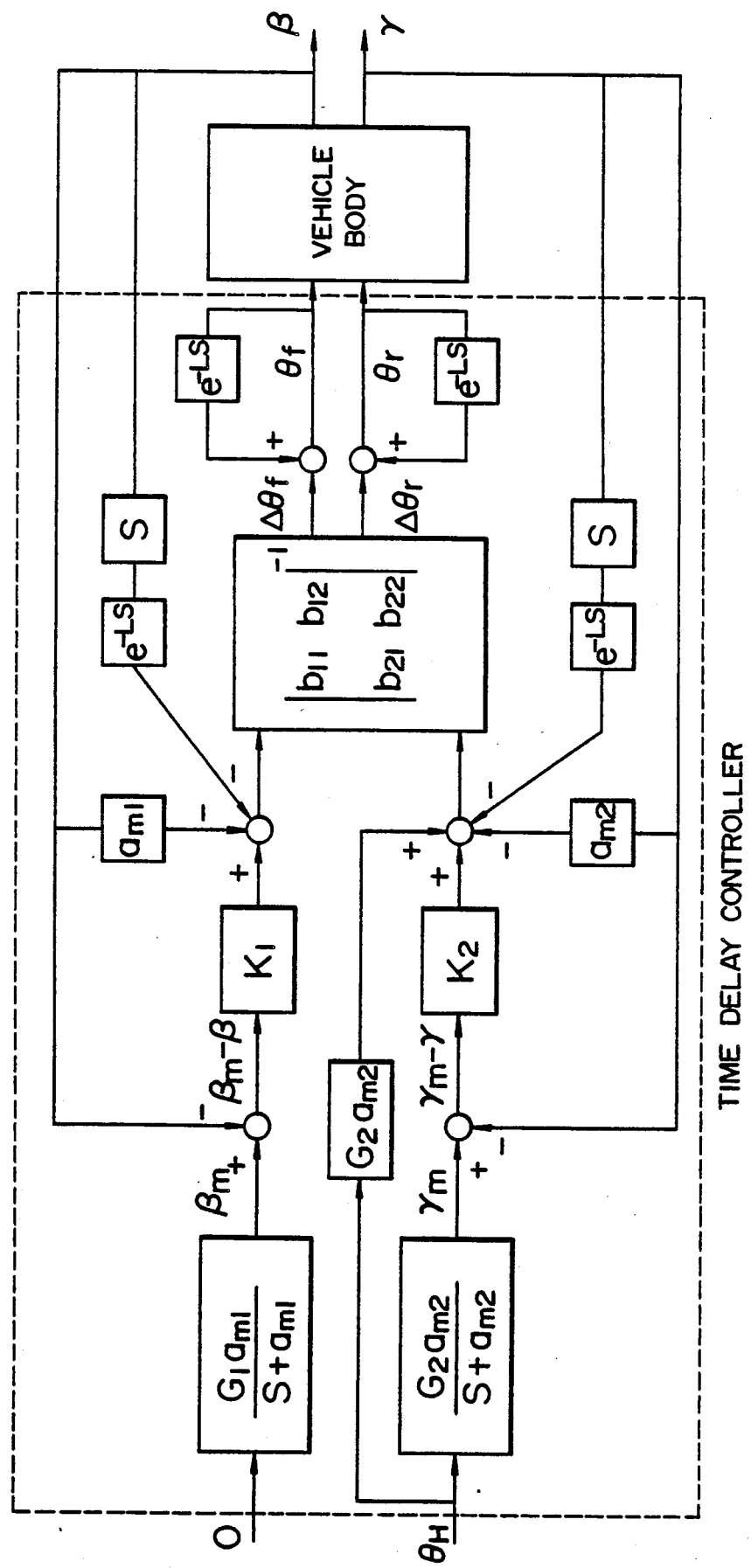
FIG. 8 is a TDC control block diagram in the present embodiment.

FIG. 8 is a block diagram showing the time delay controller for realizing the expression (64). The yaw rate detection circuit 64 comprises an angular velocity sensor, and its output is applied to the controller 61. With the side slip angle detection circuit 63, it is difficult to directly obtain a vehicle body side slip angle $\beta$. However, by using the following relational expressions:

$$\beta = \tan^{-1}\frac{y}{V} \approx \frac{y}{V} \quad (65)$$

$$\alpha = \dot{y} + V\gamma \quad (66)$$

the following result is obtained.

$$\beta = \frac{1}{V}\int(\alpha - V\gamma)dt \quad (67)$$

where, $\alpha$ is a lateral acceleration of the vehicle, y is a lateral acceleration of the vehicle, and a toward velocity V is constant when $\beta$ is calculated. $\tan\beta \approx \beta$. By the expression (67), the vehicle body side slip angle is obtained from the yaw rate $\gamma$, the vehicle lateral acceleration $\alpha$ and the vehicle toward velocity V. Based on the expression (64) in the structure shown in FIGS. 6 and 8 as described above, it is possible to control the vehicle body side slip angle $\beta$ to be kept always at zero by controlling the front wheel steering angle $\theta_f$ and the rear wheel steering angle $\theta_r$, to make a vehicle body direction coincide with the vehicle proceeding direction regardless of the vehicle speed, and to provide a response model of the desired yaw rate corresponding to the wheel steering angle, with which the yaw rate response of the actual vehicle is coincided. As a result, it is possible to realize a satisfactory stability and steerability of the vehicle body in high speed running. In the present embodiment, it is targeted that the side slip angle $\beta$ is always stayed at zero. However, the reference model corresponding to the wheel steering angle may also be given instead. Further, the reference model is not limited to a first ordered system but may be a second-order lag system or a higher ordered system.

We claim:

1. An adaptive control system for controlling a response characteristic of a vehicle driven by a motor having at least one dynamic variable, said adaptive control system comprising:

actuator means for controlling said dynamic variable;

detection means for detecting said motor variable and producing a corresponding instantaneous value output representative thereof;

reference model means for storing predetermined desired values for said motor variable representing a predetermined desired motor response characteristic;

desired value setting means for setting said motor variable to a desired value;

controlled variable calculation means for calculating a control input to said actuator means in accordance with said instantaneous value output from said detection means and predetermined desired values retrieved from said reference model means, whereby said actuator means controls said motor variable in accordance with said desired value set by said desired value setting means.

2. An adaptive control system for vehicles according to claim 1, wherein said actuator means is a drive unit for controlling an opening of an engine throttle value.

3. An adaptive control system for vehicles according to claim 2, wherein said drive unit is an actuator for adjusting a throttle valve opening to control a vehicle speed at any desired vehicle speed, and said desired vehicle speed is the same value as detected by said detection means at an arbitrary time and is given by said desired value setting means.

4. An adaptive control system for vehicles according to claim 1, wherein said actuator includes two steering angle control units for controlling steering angles of the front and rear wheels respectively at any desired steering angle, said detection means comprises means for detecting a yaw rate of said vehicle body and means for detecting a side slip angle of the vehicle body, and said controlled variable calculation means calculates said steering angles of the front and rear wheels.

5. An adaptive control system as in claim 1, wherein said dynamic variable is one of oil pressure, engine compression and engine speed.

* * * * *

UNITED STATES PATENT AND TRADEMARK OFFICE
CERTIFICATE OF CORRECTION

PATENT NO. : 5,094,127
DATED : March 10, 1992
INVENTOR(S) : Akira ISHIDA, et al

It is certified that error appears in the above-identified patent and that said Letters Patent is hereby corrected as shown below:

Column 5, Equation (1) should read:

-- $\dot{X} = f(X, t) + h(X, t) + B(X, t) U(t) + d(t)$

Column 5, Equation (2) should read:

-- $\dot{X}m = AmXm + BmR$

Column 6, Equation (4) should read:

-- $\dot{e} = \dot{X}m - \dot{X} = Ame + \{-f-h-d+AmX+BmR-BU\}$

Column 6, Equation (6) should read:

-- $\dot{e} = (Am + K) e = Ae e$

Column 6, Equation (8) should read:

-- $\dot{X} = f+h+B(B^TB)^{-1}B^T \{-f-h-d+AmX+BmR-Ke\} + d$

Column 6, Equation (9) should read:

-- $\dot{e} = \{Am+B(B^TB)^{-1}B^TK\} e + \{I-B(B^TB)^{-1}B^T\}$ $\{-f-h-d+AmX+BmR\}$ --

Column 6, Equation (11) should read:

-- $\dot{e} = \{Am + B(B^TB)^{-1}B^TK\}e$

UNITED STATES PATENT AND TRADEMARK OFFICE
CERTIFICATE OF CORRECTION

PATENT NO. : 5,094,127

DATED : March 10, 1992

INVENTOR(S) : Akira ISHIDA, et al

It is certified that error appears in the above-identified patent and that said Letters Patent is hereby corrected as shown below:

Column 6, Equation (12) should read:

-- $h + d = \dot{X} - f - BU$

Column 6, Equation (14) should read:

-- $\hat{h}(X, t) + \hat{d}(t) = \dot{X}(t - L) - f(X, t-L)$ $\quad\quad - B(X, t-L)\, U(t-L)$ Column 7, Equation (15) should read:

-- $U(t) = \{B^T(t)B(t)\}^{-1} B^T(t) \{-f(t)-\dot{X}(t-L)+f(t-L)$ $\quad\quad + B(t-L)U(t-L) + AmX(t) + BmR(t) - Ke(t)\}$ Column 7, Equation (18) should read:

-- $U(t) = Br^{-1}(t) \{-fr(t)-\dot{X}r(t-L)+fr(t-L)+Br(t-L)U(t-L)$ $\quad\quad +AmrX(t)+BmrR(t)-Kre(t)\}$ Column 8, Equation (26) should read:

-- $\dot{V}(t) = -aV(t) + bU(t)$

Column 8, Equation (27) should read:

-- $\dot{V}m(t) = -amVm(t) + bmR(t) \quad\quad am, bm > 0$

UNITED STATES PATENT AND TRADEMARK OFFICE
CERTIFICATE OF CORRECTION

PATENT NO. : 5,094,127

DATED : March 10, 1992

INVENTOR(S) : Akira ISHIDA, et al

It is certified that error appears in the above-identified patent and that said Letters Patent is hereby corrected as shown below:

Column 8, Equation (28) should read:

-- $\dot{e}(t) = -(am + K) e(t) \qquad am + K > 0$

Column 9, Equation (30) should read:

-- $\dot{e} = -ame - amV + bmR + aV - bU$

Column 9, Equation (33) should read:

-- $aV = -\dot{V} + bU$

Column 9, Equation (35) should read:

-- $\hat{h}(t) = -\dot{V}(t - L) + bU(t - L)$

Column 9, Equation (36) should read:

-- $U(t) = U(t - L) + b^{-1} \{-\dot{V}(t - L)$ $- amV(t) + bmR + Ke\}$

Column 9, Equation (37) should read:

-- $U(t) = U(t - L) + \hat{b}^{-1} \{-\dot{V}(t - L)$ $-amV(t) + bmR + Ke\} \qquad b > 0$ Column 9, line 65, "-V(t-L)" should read -- $-\dot{V}(t-L)$ --.

UNITED STATES PATENT AND TRADEMARK OFFICE
CERTIFICATE OF CORRECTION

PATENT NO. : 5,094,127
DATED : March 10, 1992
INVENTOR(S) : Akira ISHIDA, et al

It is certified that error appears in the above-identified patent and that said Letters Patent is hereby corrected as shown below:

Column 10, line 1, after "value" insert -- $\hat{b}$ --;

Column 10, Equation (38) should read:

$$-- \hat{b}(1 - e^{-LS})U(S) = \{-(Se^{-LS} + am)V(S) + bmR(S) + Ke(S)\}$$

Column 10, Equation (42) should read:

$$-- \{\hat{b}b^{-1}(S+a)(1-e^{-LS}) + Se^{-LS} + am + K\}V(S)$$
$$= (S+am+K)Vm(S)$$

Column 10, Equation (44) should read:

$$-- \frac{V(S)}{Vm(S)} = \frac{(2+LS)(S+am+K)}{2\hat{b}b^{-1}(S+a)LS+S(2-LS)+(2+LS)(am+K)}$$

Column 10, Equation (45) should read:

$$-- F(S) = (2\hat{b}b^{-1} - 1)LS^2 + \{(2a\hat{b}b^{-1} + am + K)L + 2\}S + 2(am + K)$$
$$= A_0 S^2 + A_1 S + A_2$$

Column 10, Equation (46) should read:

$$-- A_0 = (2\hat{b}b^{-1} - 1)L > 0$$

UNITED STATES PATENT AND TRADEMARK OFFICE
CERTIFICATE OF CORRECTION

PATENT NO. : 5,094,127

DATED : March 10, 1992

INVENTOR(S) : Akira ISHIDA, et al

It is certified that error appears in the above-identified patent and that said Letters Patent is hereby corrected as shown below:

Column 10, Equation (47) should read:

-- $\hat{b} > b/2$

Column 10, Equation (48) should read:

-- $\hat{b} > b\,max/2$

Column 11, line 29, after "value" insert -- $\hat{b}$ --;

Column 11, Equation (51) should read:

-- $U(t) = U(t - 0.72) + \{ -10\dot{V}(t - 0.72) -1.25V(t) + 1.25R\} \quad \hat{b} > 0$ Column 12, Equation (52) should read:

-- $\begin{pmatrix} \dot{\beta}(t) \\ \dot{\gamma}(t) \end{pmatrix} = \begin{pmatrix} a_{11} & a_{12} \\ a_{21} & a_{22} \end{pmatrix} \begin{pmatrix} \beta(t) \\ \gamma(t) \end{pmatrix} + \begin{pmatrix} b_{11} & b_{12} \\ b_{21} & b_{22} \end{pmatrix} \begin{pmatrix} \theta_f(t) \\ \theta_r(t) \end{pmatrix}$

UNITED STATES PATENT AND TRADEMARK OFFICE
CERTIFICATE OF CORRECTION

PATENT NO. : 5,094,127

DATED : March 10, 1992

INVENTOR(S) : Akira ISHIDA, et al

It is certified that error appears in the above-identified patent and that said Letters Patent is hereby corrected as shown below:

Column 13, Equation (61) should read:

$$-- \begin{pmatrix} \dot{\beta}_m(t) \\ \dot{\gamma}_m(t) \end{pmatrix} = \begin{pmatrix} -a_{m1}, & 0 \\ 0, & -a_{m2} \end{pmatrix} \begin{pmatrix} \beta_m(t) \\ \gamma_m(t) \end{pmatrix} + \begin{pmatrix} a_{m1}G_1, & 0 \\ 0, & a_{m2}G_2 \end{pmatrix} \begin{pmatrix} 0 \\ \theta_H(t) \end{pmatrix}$$

Column 13, lines 36-40 should read:

$$-- \quad -\dot{\beta}(t-L) - a_{m1}\beta(t) + a_{m1}G_1 x0 + K_1(\beta_m(t)-\beta(t))$$
$$-\dot{\gamma}(t-L) - a_{m2}\gamma(t) + a_{m2}G_2 x\theta_H(t) + K_2(\gamma_m(t)-\gamma(t)) \quad --;$$

Column 13, Equation (65) should read:

$$-- \quad \beta = \tan^{-1} \frac{\dot{y}}{V} \approx \frac{\dot{y}}{V}$$

Column 13, Equation (66) should read:

$$-- \quad \alpha = \ddot{y} + V\gamma$$

Column 13, line 59, "y" should be -- $\ddot{y}$ --;

UNITED STATES PATENT AND TRADEMARK OFFICE
CERTIFICATE OF CORRECTION

PATENT NO. : 5,094,127
DATED : March 10, 1992
INVENTOR(S) : Akira Ishida, et al

It is certified that error appears in the above-indentified patent and that said Letters Patent is hereby corrected as shown below:

Column 13, lines 60 and 64, "toward" should be --forward--.

Signed and Sealed this

Eighth Day of November, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,094,127
DATED : March 10, 1992
INVENTOR(S) : Akira ISHIDA, et al.

It is certified that error appears in the above-identified patent and that said Letters Patent is hereby corrected as shown below:

Column 9, Equation (37) should read:

$$--U(t) = U(t - L) + \hat{b}^{-1} \{-\dot{V}(t - L) - amV(t) + bmR + Ke\} \quad \hat{b} > 0--.$$

Signed and Sealed this

Twentieth Day of October, 1998

Attest:

BRUCE LEHMAN

*Attesting Officer*  *Commissioner of Patents and Trademarks*